(12) United States Patent
Alberth et al.

(10) Patent No.: US 8,937,987 B2
(45) Date of Patent: Jan. 20, 2015

(54) PULSE FREQUENCY MODULATION (PFM) MODE LOCK OUT FOR REGULATORS WHEN RECEIVE SIGNAL QUALITY IS LOW

(75) Inventors: William P. Alberth, Prairie Grove, IL (US); Armin W. Klomsdorf, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 233 days.

(21) Appl. No.: 13/194,503

(22) Filed: Jul. 29, 2011

(65) Prior Publication Data
US 2013/0028300 A1 Jan. 31, 2013

(51) Int. Cl.
*H04B 1/38* (2006.01)
*H04L 5/16* (2006.01)
*H04B 1/16* (2006.01)
*H02M 1/44* (2007.01)
*H02M 1/00* (2006.01)

(52) U.S. Cl.
CPC .............. *H04B 1/1607* (2013.01); *H02M 1/44* (2013.01); *H02M 2001/0032* (2013.01); *Y02B 70/16* (2013.01)
USPC .......................................................... 375/219

(58) Field of Classification Search
USPC ........................................................ 375/219
See application file for complete search history.

(56) References Cited

U.S. PATENT DOCUMENTS

| | | | |
|---|---|---|---|
| 6,757,526 B1 | 6/2004 | Sharp et al. | |
| 7,505,742 B2 | 3/2009 | Sharp et al. | |
| 7,679,433 B1 | 3/2010 | Li | |
| 7,746,673 B2 | 6/2010 | Grant et al. | |
| 7,826,815 B2 | 11/2010 | Ajram et al. | |
| 7,928,705 B2 * | 4/2011 | Hooijschuur et al. | 323/272 |

(Continued)

FOREIGN PATENT DOCUMENTS

| | | |
|---|---|---|
| CN | 101504541 A | 8/2009 |
| JP | 2009033591 A | 2/2009 |

(Continued)

OTHER PUBLICATIONS

"International Preliminary Report on Patentability Chapter I (IB-373)," PCT/US2012/047814, Feb. 4, 2014.*
Patent Cooperation Treaty, International Search Report and Written Opinion of the International Searching Authority for International Application No. PCT/US2012/047814 (CS38453), Oct. 26, 2012, 15 pages.

*Primary Examiner* — Michael Neff
*Assistant Examiner* — Nader Bolourchi
(74) *Attorney, Agent, or Firm* — Leydig, Voit & Mayer, Ltd.

(57) ABSTRACT

A method, power switching system, and communications device supply power in a pulse width modulation (PWM) mode to a transceiver whenever the transceiver processes a low quality signal. A power supply mode (PSM) utility/controller determines a quality of a signal that is currently being processed by a transceiver, and when the quality of the signal is less than a pre-set threshold level, the PSM controller triggers the power supply to operate exclusively in the PWM supply mode. However, when the quality of the signal satisfies a preset threshold level, the PSM controller enables the power supply to autonomously switch between the PFM supply mode and the PWM supply mode. In one embodiment, the controller dynamically determines a power demand by the transceiver and when the power demand exceeds a preset threshold demand level, the controller triggers the power supply to operate exclusively in the PWM supply mode.

19 Claims, 8 Drawing Sheets

400

| Functional Mode | Priority | Power Supply Mode |
|---|---|---|
| 402 → WIFI | 2 | PFM |
| 404 → Cellular | 1 | PWM |
| 406 → Bluetooth | 3 | PFM |

(56) References Cited

U.S. PATENT DOCUMENTS

| | | |
|---|---|---|
| 2004/0141341 A1* | 7/2004 | Higashitani et al. ............ 363/59 |
| 2005/0057238 A1* | 3/2005 | Yoshida ........................ 323/282 |
| 2006/0033483 A1* | 2/2006 | Wu .............................. 323/282 |
| 2008/0203989 A1* | 8/2008 | Bacchi et al. ................. 323/284 |
| 2009/0046487 A1* | 2/2009 | Emira ........................... 363/78 |
| 2009/0230934 A1* | 9/2009 | Hooijschuur et al. ........ 323/282 |
| 2011/0014890 A1 | 1/2011 | Ajram et al. |

FOREIGN PATENT DOCUMENTS

| | | |
|---|---|---|
| JP | 2011114992 A | 6/2011 |
| WO | 2006102931 A1 | 10/2006 |
| WO | 2009112900 A1 | 9/2009 |

* cited by examiner

| Functional Mode | Priority | Power Supply Mode |
|---|---|---|
| WIFI | 2 | PFM |
| Cellular | 1 | PWM |
| Bluetooth | 3 | PFM |

PULSE FREQUENCY MODULATION (PFM) MODE LOCK OUT FOR REGULATORS WHEN RECEIVE SIGNAL QUALITY IS LOW

BACKGROUND

1. Technical Field

The present invention relates in general to wireless communications devices and in particular to power systems in wireless communications devices.

2. Description of the Related Art

With wireless communications devices, one of two power supply methodologies, pulse width modulation (PWM) and pulse frequency modulation (PFM), can be implemented. Each methodology has different advantages and disadvantages associated with various device operating modes. The main advantage of PWM is that the switching frequency is constant and can be chosen to avoid interference or generally designed for low electromagnetic interference (EMI). The main disadvantage of PWM is the switching efficiency decreases as the load current decreases. Thus, at light load, PWM efficiency is poor. On the other hand, PFM provides better efficiency at low to moderate load currents, as the switching frequency is adjusted in response to the load current. The frequency of operation and corresponding EMI that may interfere with radio frequency (RF) circuit operation, however, is not predictable. As the number of band/mode combinations in a single communication device increases, the PFM mode increasingly compromises performance in some operating conditions.

BRIEF DESCRIPTION OF THE DRAWINGS

The described embodiments are to be read in conjunction with the accompanying drawings, wherein:

FIG. 4 is an example table showing various functional and operational modes, with associated priorities and preferred default power supply modes for each functional mode, according to one embodiment;

DETAILED DESCRIPTION

Figure 1:
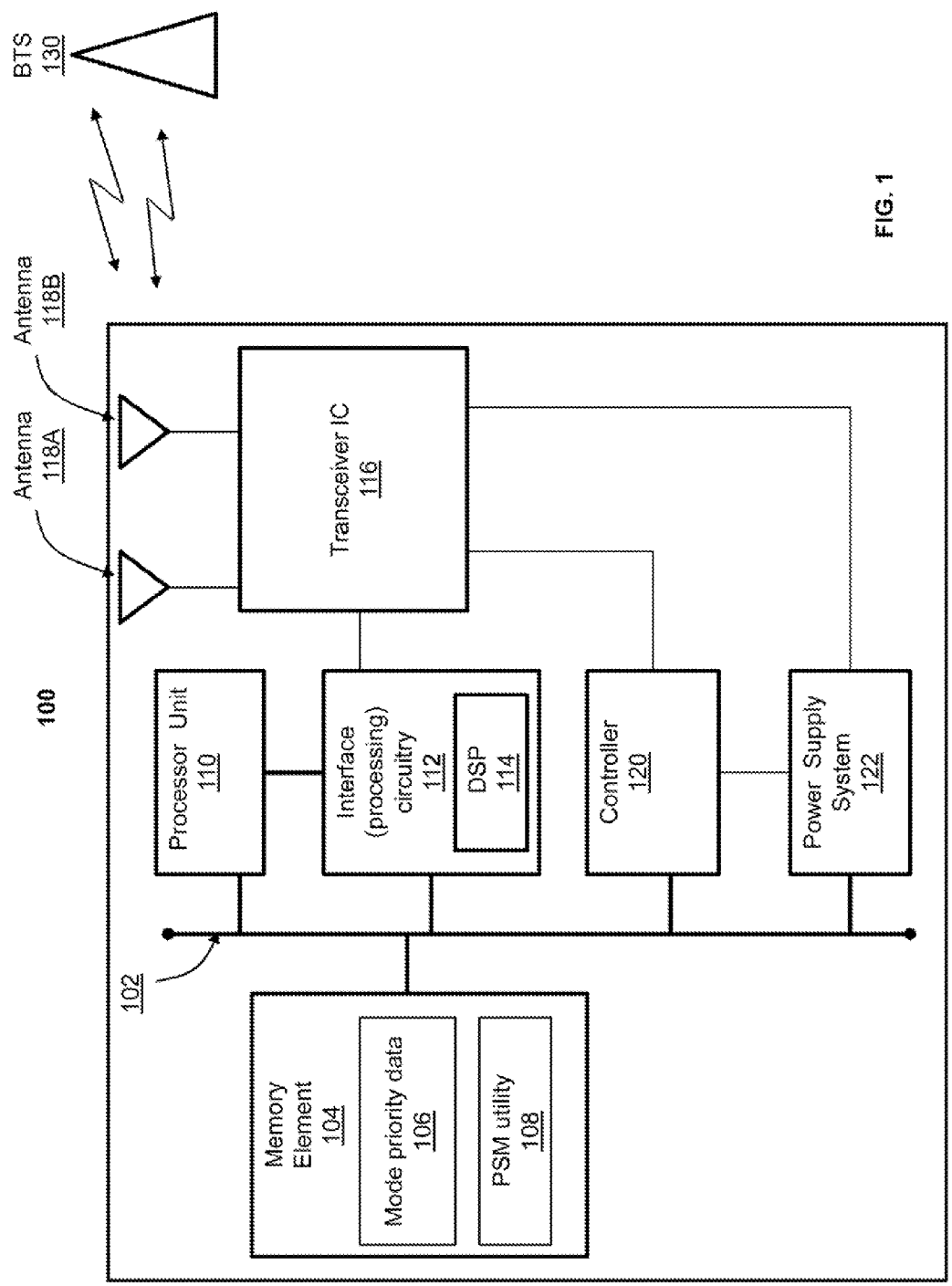
FIG. 1 illustrates an example block diagram representation of a wireless communications device, within which features of the described embodiments can be incorporated, according to one embodiment.

The illustrative embodiments provide a method, power switching system, and communications device that supply power to a transceiver exclusively in a pulse width modulation (PWM) mode whenever the device detects one of multiple pre-designated operating conditions from among: (a) the transceiver processes a low quality signal; and (b) the transceiver has a relatively high power demand. In a first embodiment, a power supply mode (PSM) utility or PSM controller determines a quality of a signal that is currently being processed by a transceiver, and when the quality of the signal is less than a pre-set threshold level, the PSM controller triggers the power supply to operate exclusively in the PWM supply mode. However, when (a) the quality of the signal satisfies the preset threshold level and (b) the transceiver has a relatively low power demand, the PSM controller enables the power supply to autonomously switch between the PFM supply mode and the PWM supply mode. In one embodiment, the controller dynamically determines a power demand by the transceiver, and when the power demand exceeds a preset threshold demand level, the controller triggers the power supply to operate exclusively in the PWM supply mode. In yet another embodiment, the PSM controller can trigger the power supply to operate in PWM mode when the device is in an active transceiver mode of operation. In another embodiment, the PSM controller may trigger the power supply to operate in a particular supply mode to provide power to multiple different transceiver components associated with concurrently operating functions. In this case, the PSM controller may trigger the power supply to operate in the preferred mode of the operating function having a highest assigned priority relative to the other concurrently operating functions, while providing respective levels of power to enable the concurrent operations.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the described embodiments. The embodiments may thus be described with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the claimed embodiments to embodiments in which different element, feature or concept names are utilized. Thus, each term utilized herein is to be given its broadest interpretation given the context in which that terms is utilized.

As further described below, implementation of the functional features of the invention described herein is provided within processing devices/structures and can involve use of a combination of hardware, firmware, as well as several software-level constructs (e.g., program code) that execute to provide a specific utility for the device. The presented figures illustrate both hardware components and software/logic components within example wireless communications device architecture.

With specific reference now to FIG. 1, there is depicted a block diagram of an example dual antenna wireless communications device 100, within which certain of the functional aspects of the described embodiments may advantageously be implemented. For simplicity, wireless communications device 100 shall be referred to herein simply by the acronym WCD 100. In one embodiment, the wireless communications device is a mobile device, such as a cellular phone, smartphone or laptop, netbook or tablet computer or similar device. As such, WCD 100 can be any type of communication device with a transceiver and a variable power supply source that includes a two-way radio communication device. WCD 100 comprises processor 110 and communication interface circuitry 112 which comprises digital signal processor (DSP) 114. Processor 110 and interface circuitry 112 are connected to memory element 104 via signal bus 102. WCD 100 includes a radio frequency (RF) transceiver integrated circuit (IC) 116 that enables WCD to send and receive communication signals. In at least one embodiment, the sending and receiving functions of the transceiver occurs wirelessly, and the wireless communication is facilitated by one or more antennas (e.g., antenna 118A and antenna 118B) coupled to the transceiver IC 116. The number of antennas can vary from device to device, ranging from a single antenna to two or more antennas, and the presentation within WCD 100 of two antennas is merely for illustration. WCD 100 is able to wirelessly communicate with, for example, base transceiver system (BTS) 130 (or simply base-station) via antenna 118A/118B. WCD 100 also comprises controller 120 and power supply system 122, which provide specific functionality that are described in greater detail below.

In addition to the above described hardware components of WCD 100, various features of the described embodiments can be completed and/or supported via software (or firmware) code or programmable logic stored within a controller (e.g., controller 120), memory 104, or other storage (not shown) and executed by one of DSP 114 and processor 110. Thus, for example, illustrated within memory 104 are a number of software, firmware, and/or logic components (or modules), including device operating mode priority data 106. As illustrated, Memory 104 also comprises PSM utility 108.

In the descriptions which follow, PSM utility 108 represents additional software, firmware, and/or logic components, which execute on processor 110 and/or controller 120 to provide specific functions, as described below. In the described embodiment, PSM utility 108 provides certain executable code that triggers controller 120 to perform certain power supply management functions. Additional detail of the functionality associated with PSM utility 108 is presented below with reference to FIG. 2 and subsequent figures.

Certain of the functions supported and/or provided by PSM utility 108 can be implemented via processing logic (or code) executed by a wireless device processor and/or other device hardware. Among the software code (also interchangeably referred to herein as program instructions and programmable logic) provided by PSM utility 108, in the described embodiments, are: (a) logic for pre-configuring a power supply to interchangeably operate in both a PWM supply mode and a PFM supply mode in order to supply power to a transceiver during normal device operations; (b) logic for determining a quality level of a signal that is being processed by the transceiver; (c) logic for, in response to the quality level of the signal being below a pre-established threshold performance level, triggering the power supply to operate exclusively in the PWM supply mode; (d) logic for dynamically determining a level of power supply demand that is associated with dynamically changing device operations; and (e) logic for, in response to determining that the level of power supply demand exceeds a threshold power supply level, triggering the power supply to operate exclusively in the PWM supply mode. In one embodiment, the PSM utility further provides: (f) logic for evaluating power supply demands for multiple, simultaneously active device operations each associated with different functional operational modes of the communications device; logic for determining (or retrieving from a pre-designated set of operating mode priorities) a respective priority level of each of the multiple active device operations; and logic for triggering the power supply to operate in the supply mode that is pre-established as a best supply mode for an active device operation that has a highest priority.

Figure 2:
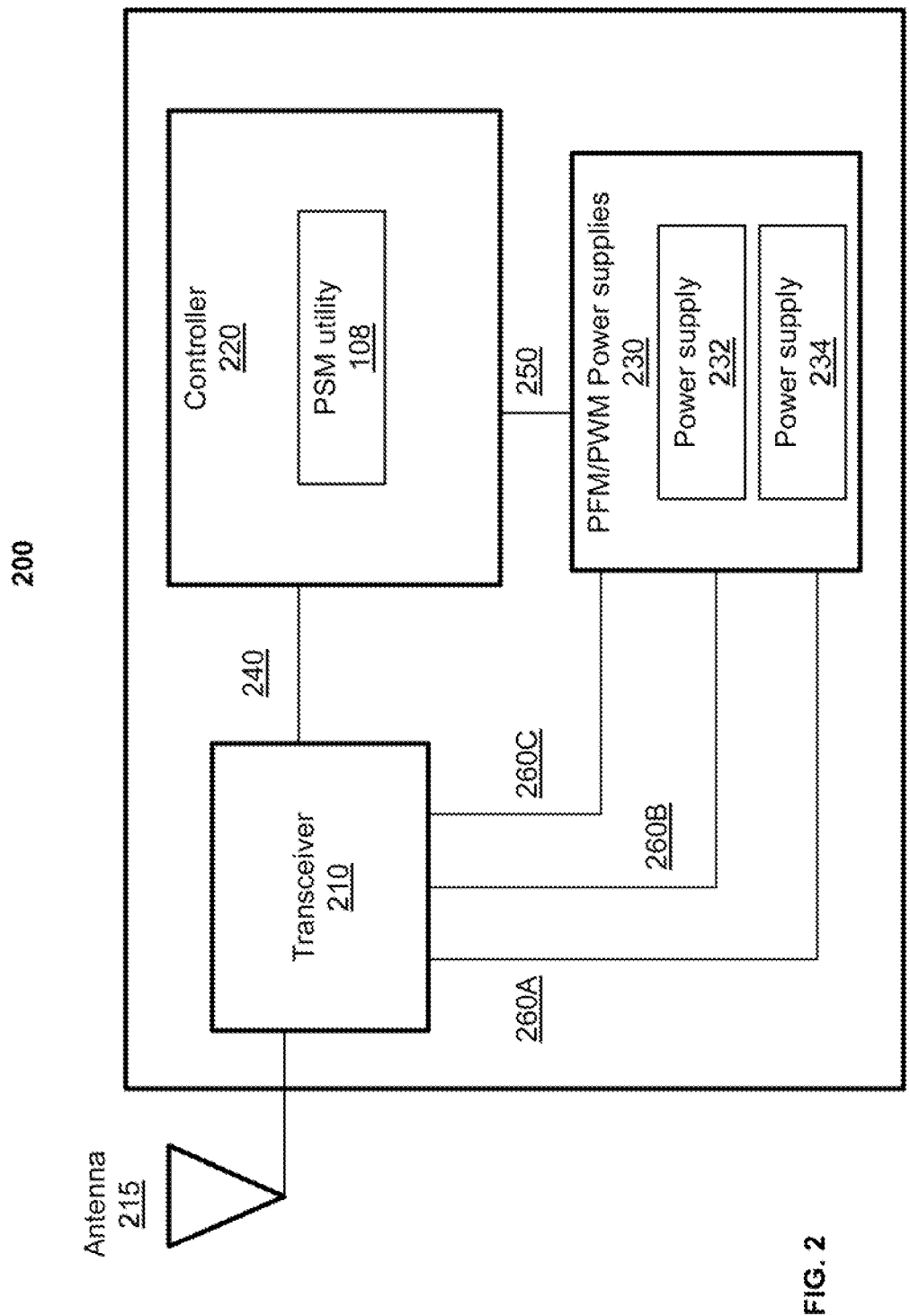
FIG. 2 illustrates another view of an example wireless communications device within which the described embodiments may be implemented, according to one embodiment.

With reference now to FIG. 2, there is presented another example of a wireless communication device (WCD), according to one embodiment. WCD 200 includes a transceiver 210 coupled to a power supply 230. Power supply 230 may represent multiple power supplies including first power supply 232 and second power supply 234. One or more of power supplies 230 may be dedicated to transceiver 210. On the other hand, one or more of power supplies 232, 234 may be shared between transceiver 210 and another transceiver (not explicitly shown). That is, WCD 200 can comprise multiple transceivers (see, for example, FIG. 3), each receiving power from one or more power supplies than can be uniquely assign to a particular transceiver or shared across the multiple transceivers.

Also coupled to transceiver 210 is controller 220. Power Supply 230 is capable of selectively operating in pulse width modulation (PWM) mode and pulse frequency modulation (PFM) mode. A power line(s) (or bus connector(s)) 260 connected between power supply 230 and transceiver 210 supplies one or more power supply voltages or currents to transceiver 210. In one embodiment, power line 260 represents a group of individual lines, which respectively provide the one or more power supply voltages or currents to transceiver 210. Controller-transceiver connector (or bus) 240 connecting transceiver 210 and controller 220 provides specific types of operational information and/or signal processing information (or data) received and/or detected by transceiver 210 to controller 220. In one embodiment, the information provided to controller 220 includes information that informs controller 220 about the quality of the received signal(s) (i.e., one or more contemporaneous signals that is received and/or processed by transceiver 210). In one embodiment, a quality performance metric used to measure signal quality is associated with one or more of: (a) a received signal strength indication (RSSI); (b) an information error rate; (c) a signal to noise ratio (SNR); and (d) a modulation index of the signal that is processed by the transceiver. These metrics can be dynamically evaluated and/or determined by controller 220 based on the information received from the transceiver 210.

In a first embodiment, when controller 220 determines that the quality of the signal processed by transceiver 210 fails to reach a threshold level, controller 220 triggers power supply 230, via a control signal promulgated over controller-power supply connector 250, to operate exclusively in the PWM supply mode. If the quality of the signal processed by transceiver 210 meets a threshold level, however, controller 220 does not send the control signal. When controller 220 has previously sent the control signal to switch the power supply to operate exclusively in the PWM supply mode, and controller 220 subsequently determines that the signal quality at the transceiver has returned to the threshold level for a pre-set minimum period of time, controller 220 can, in one embodiment, generate a next signal that triggers the power supply 230 to return to normal power supply mode. During normal power supply mode of operation, power supply 230 autonomously switches between the PWM supply mode and the PFM supply mode if the controller 220 does not trigger the power supply 230 to operate in a specific supply mode.

In an alternate embodiment, the power supply is designed to allow for external switching to an exclusive power supply mode (such as PWM) by the controller for a pre-established period of time. With this alternate embodiment, the power supply automatically reverts back to normal power supply mode (i.e., alternating and/or interchangeable PWM and PFM supply modes) following the expiration of the pre-established time period following the receipt of the trigger form the controller 220 to switch to an exclusive operating mode. With this alternate embodiment, controller must periodically trigger the power supply to operate in the exclusive mode based on substantially real time operating conditions that are being contemporaneously evaluated by the controller 220.

In one embodiment, controller 220 may also trigger the power supply to operate in a particular exclusive mode based on detected power supply demands of transceiver 210. The power supply demands of one or more device transceivers (e.g., transceiver 210) can vary with the dynamically changing modes of operation of the communications device, and the controller receives real time information indicating the power needs of the transceiver(s) handling the current modes of operation. With this embodiment, the controller 220 triggers the power supply 230 to operate exclusively in PWM supply mode when a certain power level, above an established threshold level of power, is being demanded by the transceiver(s) 210.

In a related embodiment, controller 220 detects whether the device (i.e., WCD 200) operates in one of: (a) a first functional mode that utilizes the transceiver; and (b) a second functional mode that does not utilize the transceiver. In response to determining that WCD 200 is currently operating in the first functional mode, controller 220 triggers power supply 230 to activate the PWM supply mode. However, in response to determining that the device currently operates in the second functional mode, controller 220 triggers power supply 230 to activate the PFM supply mode.

One embodiment enables for granular assignment of power to different components of the transceiver 210 based on specific power requirements of the particular transceiver components. As described above, power supply 230 uses power line(s) 260 (or bus connectors) to provide one or more power supply voltages or currents to transceiver 210. For example, in cellular communications mode, a transceiver (e.g., transceiver 210) requires and/or utilizes one or more different levels of voltage or current to simultaneously power one or more of the constituent circuit components within a corresponding transceiver integrated circuit (IC). Based on this requirement by the transceiver for different levels of power, power supply 230 connects to transceiver 210 via multiple power supply lines (e.g., power lines 260A, 260B and 260C) to simultaneously provide the various levels required by the different transceiver components.

Controller 220 determines the quality level of signals that are processed by the transceiver and/or the various transceiver components, including the transceiver radio frequency (RF) components. The multiple power supply lines by which power supply 230 connects to transceiver 210 are respectively associated with the transceiver and the various transceiver components which require different levels of power to enable operation of the device and provide various device functions. The quality level of a first signal (processed by a first component of transceiver 210) may fail to meet/satisfy a threshold quality level while the quality level of a second signal (processed by a second component of transceiver 210) may fulfill (i.e., meet or exceed) the threshold quality level. As a result, controller 220 triggers power supply 230 to supply power to a first component of transceiver 210 in PWM mode via a first power line.

On the other hand, controller 220 enables power supply 230 to autonomously (a) switch between PWM and PFM modes or (b) select one of the PWM mode and PFM mode to provide power to the second component of transceiver 210. However, if the (level of) power demand by the second component of transceiver 210 is greater than a preset threshold demand level, controller 220 overrides the autonomous switching control of power supply 230 by triggering power supply 230 to provide power (via power supply 232) to the second component via only the PWM mode. Also, in one embodiment, a below threshold level of power demand by the second component may cause power supply 234, in the autonomous switching mode, to supply power in the PFM mode to the second component of transceiver 210 via the second power line while, at the same time, power supply 232 provides power in PWM mode via the first power line to the first component of transceiver 210.

In alternate embodiments, controller 220 can monitor other operating conditions to trigger power supply 230 to supply power in a particular supply mode. For example, in one embodiment, controller 220 may trigger the power supply 230 to operate in the PWM supply mode to prevent an electromagnetic interference (EMI) related to a susceptibility of an activated PFM supply mode to interference with RF circuit operation.

Figure 3:
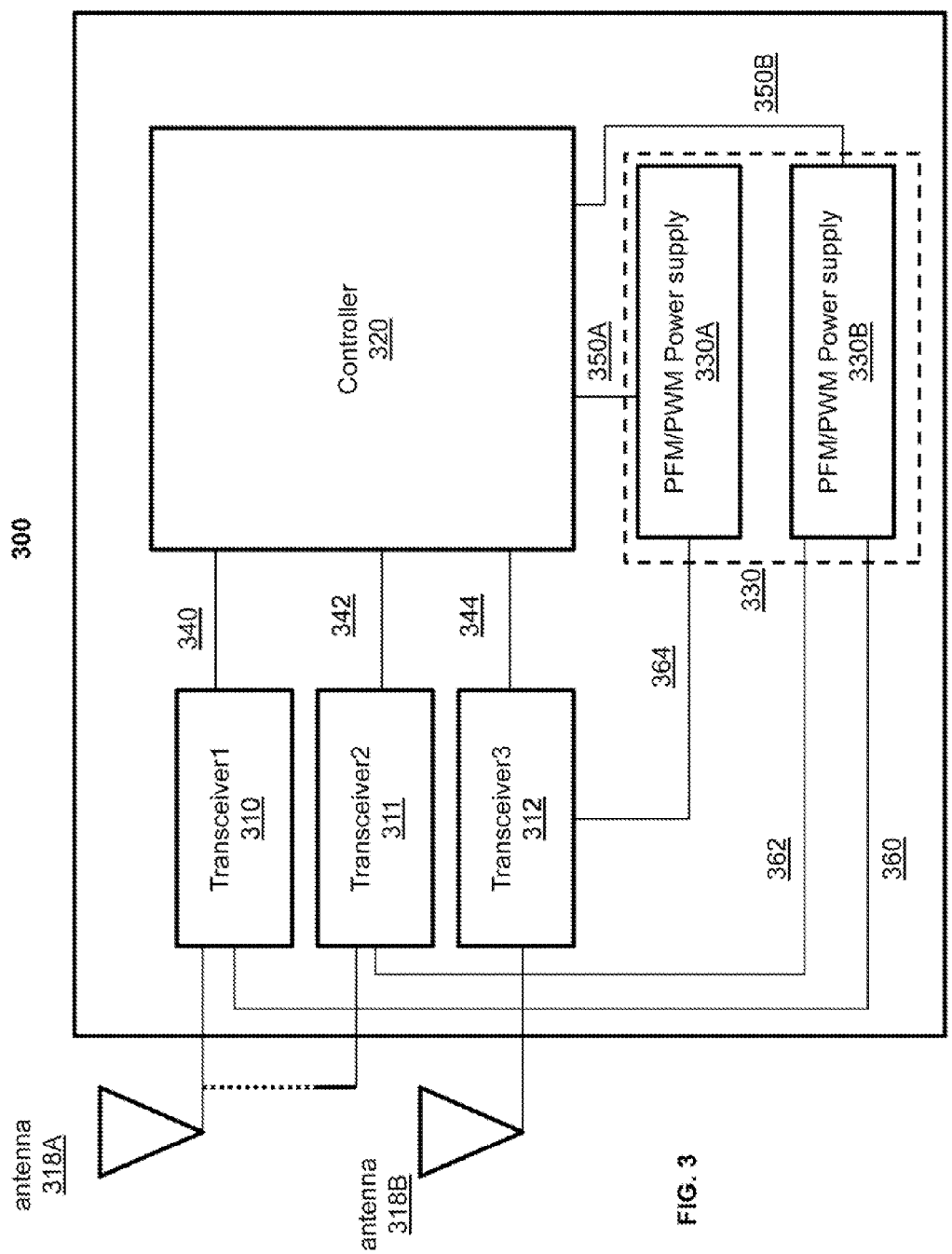
FIG. 3 illustrates a wireless communications device having multiple transceivers and which utilizes a power switching system, according to one embodiment.

Turning now to FIG. 3, a wireless communications device having multiple transceivers that utilize a power switching system, are illustrated, according to one embodiment. WCD 300 comprises first transceiver 310, second transceiver 311 and third transceiver 312. WCD 300 also comprises controller 320. Controller 320 connects to first transceiver 310, second transceiver 311 and third transceiver 312 via first controller-transceiver connector (or bus) 340, second controller-transceiver connector 342 and third controller-transceiver connector 344, respectively, to enable controller 320 to determine the quality of corresponding signals being processed by each respective transceiver. First transceiver 310, second transceiver 311 and third transceiver 312 are respectively coupled to power supply 330 via first power line (or bus connector(s)) 360, second power line 362 and third power line 364. WCD 300 also comprises first antenna 318A coupled to first transceiver 310 and second transceiver 311, and second antenna 318B coupled to third transceiver 312. Although one or more antennas are dedicated antennas (e.g., second antenna 318B), in one embodiment, one or more of the antennas may be shared between the various transceivers. For example, first antenna 318A is shared between first transceiver 310 and second transceiver 311.

Power Supply 330 is switchably or selectively capable of operating in PWM mode or PFM mode. Each of power supply lines 360, 362 and 364 can supply one or more power supply voltages or currents from power supply 330 to transceivers 310, 311, and 312 based, in part, on the particular usage of the respective transceiver. For example, in one embodiment, first transceiver 310 provides cellular communications service to communications device 300. Furthermore, first transceiver 310, while in cellular communications mode, may require multiple, different levels of voltage or current to collectively enable proper operation of transceiver 310 and transceiver components. In one embodiment, power line 360 is a group of individual, separate power supply lines or bus connectors that collectively provides multiple different levels of supply voltage or current to first transceiver 310, and specifically transceiver components. As a result, power line(s) 360 is able to provide the different levels of power required by first transceiver 310 and corresponding transceiver components to enable the provision of cellular communications service to communications device 300.

When controller 320 determines that the quality of a signal received at a corresponding transceiver, based on received signal quality data that is detected and/or received via a respective controller-transceiver connector, fails to reach a threshold level of a quality performance metric, controller 320 triggers power supply 330 via connector 350 to operate exclusively in the PWM supply mode. In one embodiment, power supply 330 comprises a plurality of power supplies, including power supply 330A and power supply 330B, which collectively supply power to the various transceivers. For example, power supply 330A is illustrated as a dedicated power supply that supplies power to third transceiver 312 via power supply line(s) 364. Supply 330B is illustrated as a shared power supply that supplies power to first transceiver 310 and second transceiver 311 via power supply line(s) 360 and power supply line(s) 362, respectively. In one embodiment, a single power supply may supply multiple different levels of voltages and/or currents. However, while supplying different levels of power, the single power supply may operate in one power supply mode only (i.e., PWM mode or PFM mode). As illustrated, one or more of the plurality of power supplies may be shared between two or more transceivers. Similarly, one or more power supplies may be dedicated to providing power to a respective single transceiver.

In one embodiment, two or more of the transceivers operate to simultaneously support multiple concurrently active operational functions of WCD 300. For example, first transceiver 310 operates to provide cellular communications service to WCD 300. Second transceiver 311 may enable global positioning system (GPS) functionality or Bluetooth connectivity. Furthermore, third transceiver 312 may provide wireless local area network (LAN) connectivity or wireless fidelity (WIFI).

One or more embodiments are provided in which the WCD 300 supports these multiple concurrent operational functions but can only provide a single power supply mode for the entire device. For example, no granular selection of different power supply modes can be made for the different transceivers, such that the device is either in normal power supply mode or exclusively in PFM mode or in PWM mode. With these embodiments, a priority scheme is provided by controller 300 to select a best overall power supply mode for the device. In such embodiments, controller 320 evaluates the power supply demands for each of these active, simultaneous or concurrent device operations associated respectively with different operating functions of WCD 300. When separate device operating functions are simultaneously or concurrently being performed, controller 320 determines a respective priority level of each of the active device operating functions by accessing pre-set priority data, and triggers the power supply to operate in the supply mode that is pre-established as a best power supply mode for the active device operating function that has a highest priority.

Referring to FIG. 4, there is an example table showing various functional and operational modes, and the corresponding priority and associated preferred, default power supply mode for each of the particular functional, operational mode, according to one embodiment. Three operating functions or operational modes are identified within the first column of Table 400, WIFI, cellular communications, and Bluetooth. As further shown by Table 400, first row 402 indicates that WIFI has priority "2", and that PFM is the preferred power supply mode for WIFI operation. Second row 404 indicates that cellular communications has the highest priority, which is priority "1", and that PWM is the preferred power supply mode for cellular communications. Third row 406 indicates that Bluetooth has priority "3", and that PFM is the preferred power supply mode for Bluetooth operation. Thus, if controller 320 detects or receives information indicating that the device is concurrently operating all three functions, the controller using the PSM utility accesses the priority data from a stored location in the device, determines which of the currently operating function has a highest priority, identifies the preferred power supply mode associated with that highest priority operating function, and then triggers the power supply to provide a power supply mode to the device corresponding to the preferred power supply mode of the highest priority operating function. In the particular example of Table 400 (FIG. 4), controller 320 determines that the cellular communications service associated with first transceiver 310 has the highest priority (i.e., priority "1") of all concurrent operations (collectively enabled by the three transceivers), and controller 320 triggers the power supply to operate in the PWM supply mode. Controller 320 triggers the power supply to operate in the PWM supply mode only if the current level of power demand (to provide cellular communications services) exceeds a preset threshold power supply level.

In other embodiments, controller 320 can utilize other pre-designated operational modes or operating conditions and/or priorities to trigger power supply 230 to supply power in a particular supply mode. As a further example, in one embodiment, controller 320 may designate the PFM mode (as a preferred mode) for device operational modes that require a power supply with a low switching frequency. In particular, controller 320 may designate a pulse skipping modulation (PSM) supply mode which is a particular low switching frequency supply mode of the PFM power supply mode.

FIGS. 5-8 are flow charts illustrating the methods by which the above processes of the illustrative embodiments are completed. Although the method illustrated in FIGS. 5-8 may be described with reference to components and functionality illustrated by and described in reference to FIGS. 1-4, it should be understood that this is merely for convenience and alternative components and/or configurations thereof can be employed when implementing the various methods. Certain portions of the methods may be completed by PSM utility 108 executing on one or more processors (processor 110/DSP 114) within WCD 100/200/300 (FIG. 1, 2 or 3) or by controller 320. The executed processes then control specific operations of or on WCD 100/200/300. For simplicity is describing the methods, all method processes are described from the perspective of controller 120/220/320. Also, the various methods of FIGS. 5-8 are illustrative of a power supply mode selection based on a single operating condition detected by controller 120/220/330; However, it is appreciated that in one or more embodiments, two or more of the conditions can be concurrently monitored by controller 120/220/330 and that controller 120/220/330 can then evaluate which power supply mode to select based on which of the detected overlapping conditions takes precedent in determining the best power supply mode for the device to operate in.

Figure 5:
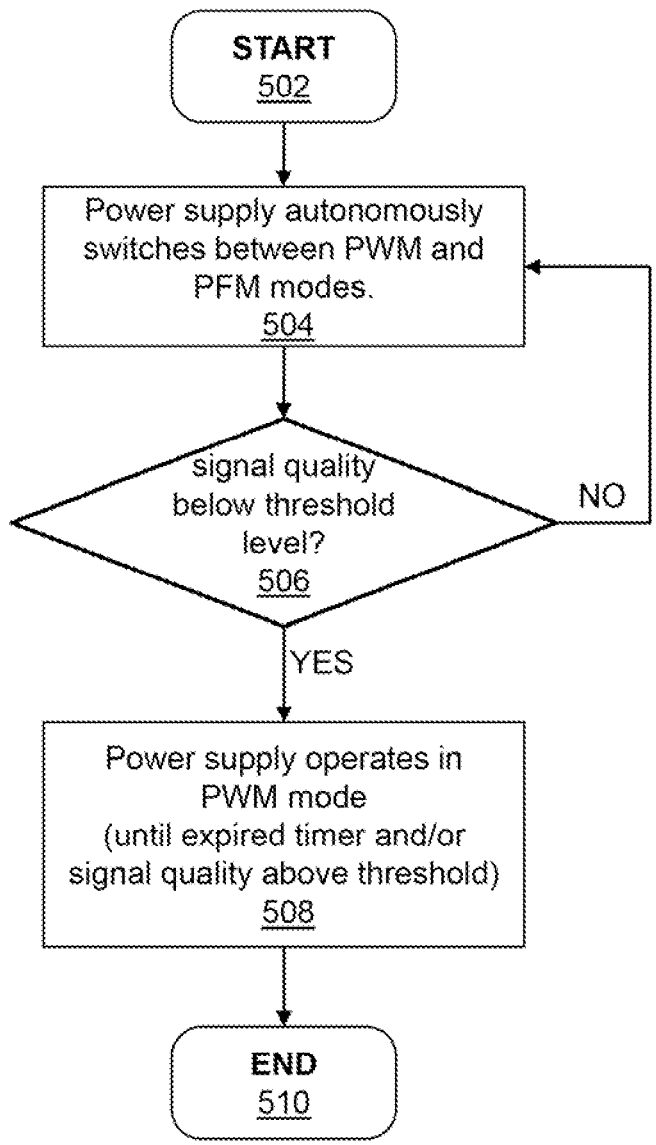
FIG. 5 is a flow chart illustrating the method for exclusively providing power to a transceiver via a pulse width modulation (PWM) mode when the transceiver processes a low quality signal, according to one embodiment.

FIG. 5 illustrates the method for exclusively providing power to a transceiver via a pulse width modulation (PWM) mode when the transceiver processes a low quality signal, according to one embodiment. The method begins at initiator block 502 and proceeds to block 504, which illustrates the device initially operating in the normal supply mode in which the power supply autonomously switches between PWM and PFM modes in order to supply power to a transceiver. During normal device operation, controller 120/220/330 detects and/or receives data corresponding to the current operating condition of or at the transceiver. At decision block 506, controller 120/220/330 determines whether the quality level of the signal processed by a transceiver fails to satisfy a threshold quality level. If at decision block 506 controller 120/220/320 determines that the quality level of the signal processed by a transceiver fails to satisfy the threshold quality level, controller 120/220/320 triggers the power supply to operate exclusively in the PWM supply mode, as shown at block 508. The power supply then operates in the PWM supply mode until the expiration of a pre-established time period and/or until the controller 120/220/330 detects that the signal quality is no longer below the threshold quality level. However, if at decision block 506 controller 220/320 determines that the quality level of the signal processed by a transceiver is at or above the threshold quality level, the controller does not adjust the power supply, and the power supply continues to operate in normal supply mode (block 504). The process ends at block 510.

Figure 6:
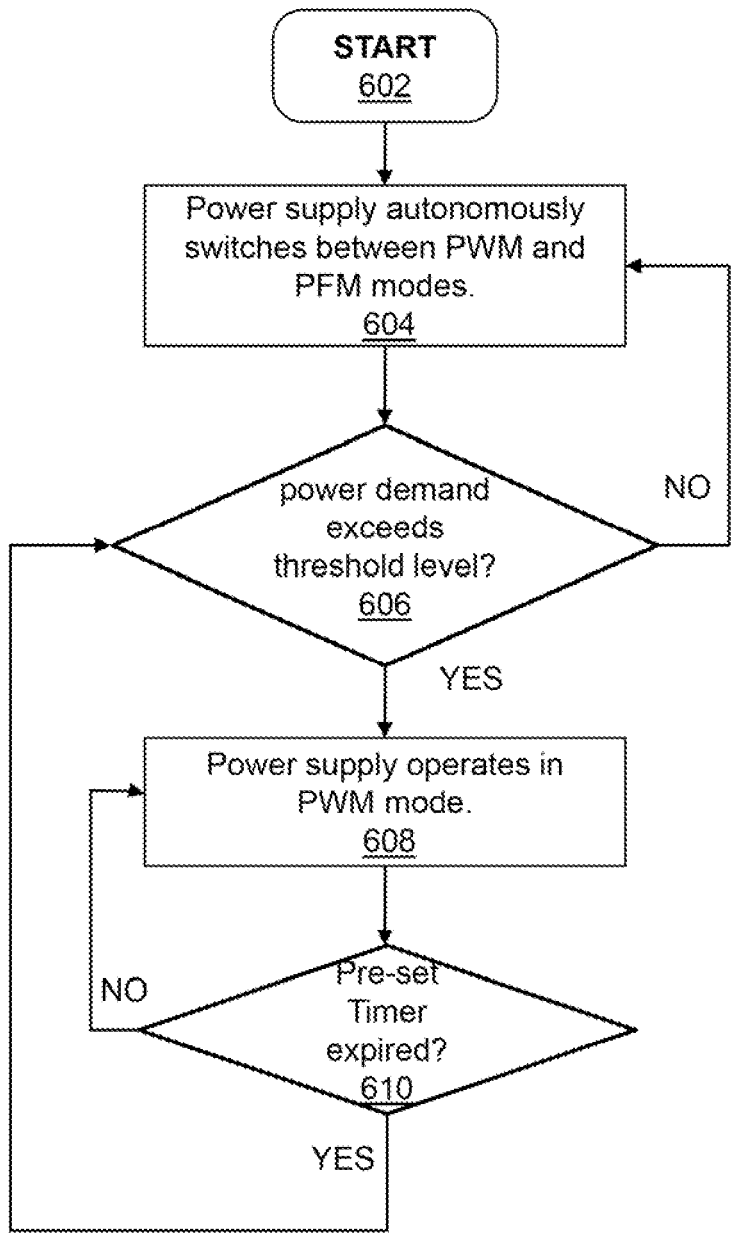
FIG. 6 is a flow chart illustrating the method for exclusively providing power to a transceiver via a PWM mode when there is a high power demand by the transceiver, according to one embodiment.

FIG. 6 illustrates the method for exclusively providing power to a transceiver via PWM mode when there is a high power demand by the transceiver, according to one embodiment. The method begins at initiator block 602 and proceeds to block 604, which illustrates the device initially operating in the normal supply mode in which the power supply autonomously switches between PWM and PFM modes in order to supply power to a transceiver. At decision block 606, controller 120/220/320 determines whether the detected power supply demands of the transceiver(s) exceed a threshold level. If at decision block 606, controller 120/220/320 determines that the power demand level exceeds the threshold level, controller 120/220/320 triggers the power supply to operate exclusively in the PWM mode, as shown at block 608. Then, at decision block 610, controller 120/220/320 (or power supply) checks if a pre-set period of time (or a timer) following the entry into the PWM mode expires. When the preset amount of time expires, controller again checks whether power demand level still exceeds the threshold level (606). However, if at decision block 606, controller 120/220/320 determines that the power demand level does not exceed the threshold level, the controller continues monitoring for the condition and the power supply continues to operate in the normal power supply mode (604).

Figure 7:
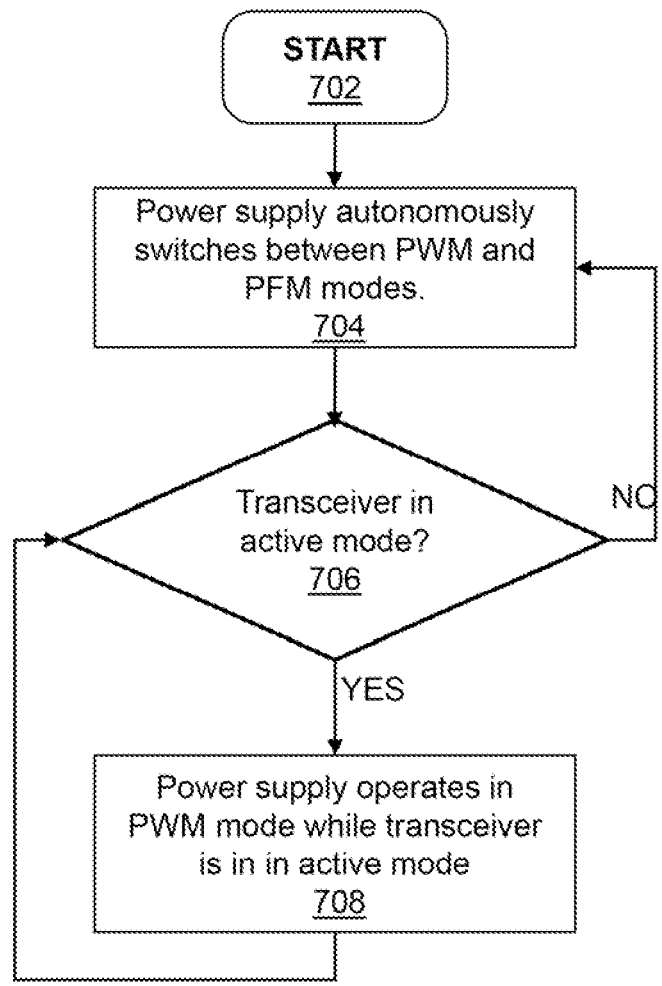
FIG. 7 is a flow chart illustrating the method for exclusively providing power to a transceiver via a PWM mode when the communications device is in a transceiver or active transceiver mode, according to one embodiment.

FIG. 7 illustrates the method for exclusively providing power to a transceiver via a PWM mode when the communications device is in a transceiver or active transceiver mode, according to one embodiment. The method begins at initiator block 702 and proceeds to block 704, which illustrates the device initially operating in the normal supply mode in which the power supply autonomously switches between PWM and PFM modes in order to supply power to a transceiver. At decision block 706, controller 120/220/320 determines whether the communications device is in an (active) transceiver mode, i.e., the transceiver is actively processing signals, versus a passive transceiver mode where the transceiver is not processing any signals. If at decision block 706, controller 120/220/320 determines that the communications device is not in an active transceiver mode but is instead in a passive transceiver mode, the power supply continues to operate in a normal supply mode (block 704). However, if at decision block 706, controller 120/220/320 determines that the communications device is in an active transceiver mode, controller 120/220/320 triggers the power supply to operate exclusively in the PWM supply mode, as shown at block 708. The controller 120/220/320 then selectively triggers the power supply to operate in the PWM supply mode responsive to the controller 120/220/320 detecting that the transceiver enters into an active transceiver mode.

Figure 8:
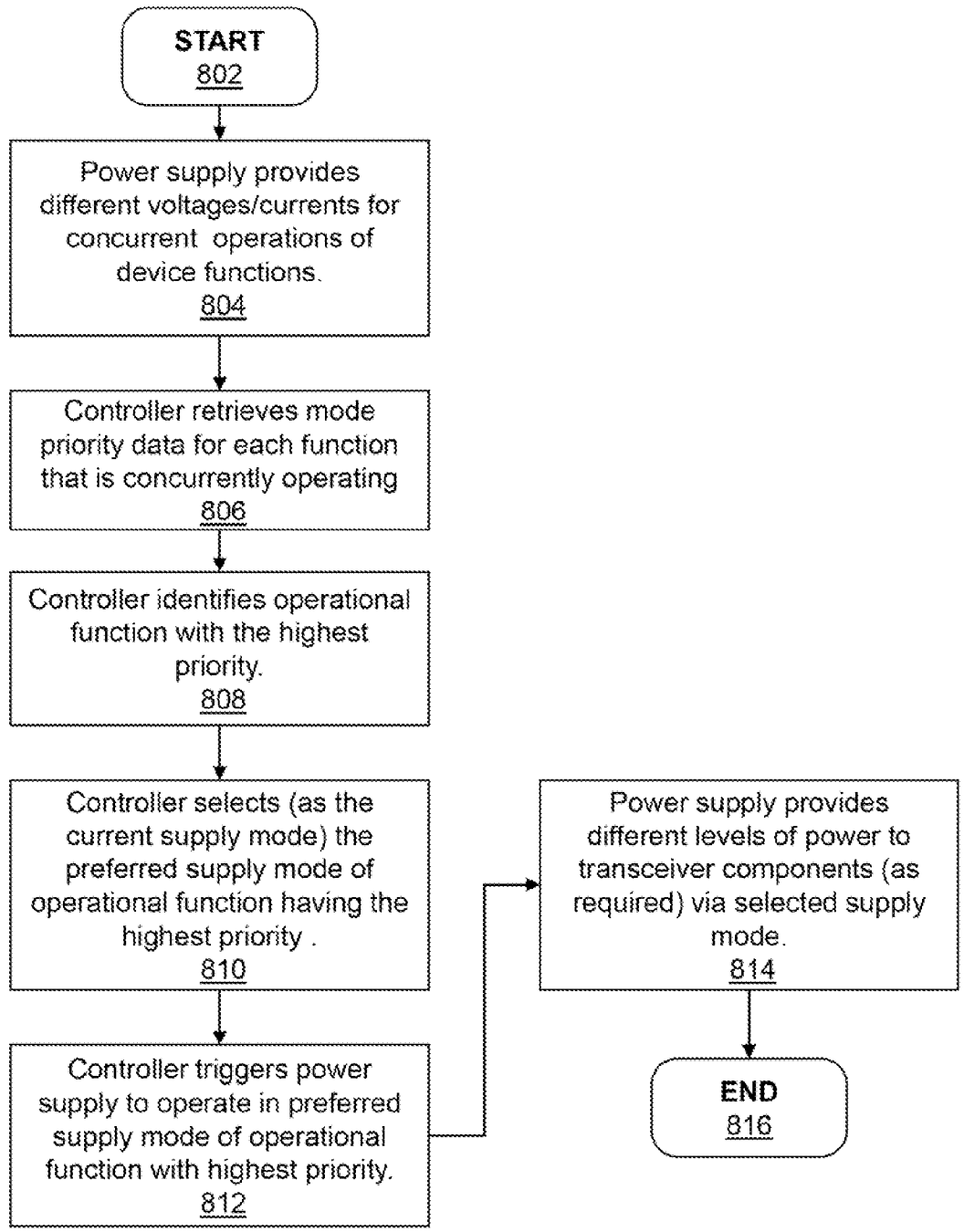
FIG. 8 is a flow chart illustrating the method for selecting a power supply mode based on pre-set priorities assigned to each of multiple concurrently operating functions being handled by the transceiver, according to one embodiment.

FIG. 8 illustrates the method for selecting a power supply mode based on pre-set priorities assigned to each of multiple simultaneous operating functions or operational modes that can be concurrently supported by the transceiver(s), according to one embodiment. The method begins at initiator block 802 and proceeds to block 804, at which controller detects that the single power supply, e.g., power supply 232, is required to provide different voltages/currents to a transceiver(s) and/or transceiver components to power multiple concurrent, active operating functions. At block 806, controller 120/220/320 retrieves stored, pre-established function priority data for the concurrently operating functions. At block 808, controller 120/220/320 identifies the active operating function with the highest priority. At block 810, controller 120/220/320 selects the preferred power supply mode of the operating function having the highest priority as the power supply mode. At block 812, controller 120/220/320 triggers the power supply to operate exclusively in the preferred power supply mode of the active operating function that has the highest priority. The power supply, e.g., power supply 232, provides the respective levels of required power to all concurrently operating functions via the selected, preferred supply mode of the active operating function that has the highest priority, as shown at block 814. The process ends at block 816.

The flowchart and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

In some implementations, certain processes of the methods are combined, performed simultaneously or in a different order, or perhaps omitted, without deviating from the spirit and scope of the invention. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A communications device comprising:
a transceiver;
a power supply capable of selectively operating in one of a pulse width modulation (PWM) supply mode and a pulse frequency modulation (PFM) supply mode, and electronically coupled to the transceiver to supply power to the transceiver according to an active supply mode of operation; and
a controller coupled to the power supply and to the transceiver and which determines a quality level of a signal that is processed by the transceiver, the controller further triggers the power supply to operate exclusively in the PWM supply mode when the quality level of the signal is below a threshold performance level, else the power supply autonomously switches between the PWM supply mode and the PFM supply mode if the controller does not trigger the power supply to operate in a specific supply mode, wherein the controller: dynamically determines a level of power supply demand associated with dynamically changing device operations, and in response to determining that the level of power supply demand exceeds a threshold power supply level, triggers the power supply to operate exclusively in the PWM supply mode.

2. The communications device of claim 1, wherein: the quality level is related to one or more of: (a) a received signal strength indication (RSSI); (b) an information error rate; (c) a signal to noise ratio (SNR); and (d) a modulation index of the signal that is processed by the transceiver.

3. A communications device comprising:
a transceiver;
a power supply capable of selectively operating in one of a pulse width modulation (PWM) supply mode and a pulse frequency modulation (PFM) supply mode, and electronically coupled to the transceiver to supply power to the transceiver according to an active supply mode of operation; and
a controller coupled to the power supply and to the transceiver and which determines a quality level of a signal that is processed by the transceiver, the controller further triggers the power supply to operate exclusively in the PWM supply mode when the quality level of the signal is below a threshold performance level, else the power supply autonomously switches between the PWM supply mode and the PFM supply mode if the controller does not trigger the power supply to operate in a specific supply mode, wherein: the PFM supply mode includes a pulse skipping modulation (PSM) supply mode of operation.

4. The communications device of claim 3, wherein the controller triggers the power supply to operate in the PWM supply mode to prevent an interference related to an activated PFM supply mode and operation of RF circuit components within the communications device.

5. The communications device of claim 1, wherein the controller:
detects whether the device operates in one of: (a) a first functional mode that utilizes the transceiver; and (b) a second functional mode that does not utilize the transceiver;
in response to the device operating in the first functional mode, triggers the power supply to activate the PWM supply mode; and
in response to the device operating in the second functional mode, triggers the power supply to activate the PFM supply mode.

6. The communications device of claim 1, wherein the controller:
evaluates power supply demands for active, concurrent device operating functions associated respectively with functional operational modes of the communications device;
determines a respective priority level of the active device operating functions; and triggers the power supply to operate in the supply mode that is pre-established as a best supply mode for an active device operating function that has a highest priority.

7. The communications device of claim 3, wherein: the quality level is related to one or more of: (a) a received signal strength indication (RSSI); (b) an information error rate; (c) a signal to noise ratio (SNR); and (d) a modulation index of the signal that is processed by the transceiver.

8. A power switching system comprising:
a power supply capable of selectively operating in one of a PWM supply mode and a PFM supply mode, to supply power to a transceiver; and
a controller coupled to the power supply and to the transceiver and which determines a quality level of a signal that is processed by the transceiver, the controller further triggers the power supply to operate exclusively in the PWM supply mode when the quality level of the signal is below a threshold performance level, else the power supply autonomously switches between the PWM supply mode and the PFM supply mode if the controller does not trigger the power supply to operate in a specific supply mode, wherein the controller: dynamically determines a level of power supply demand which demand is associated with dynamically changing device operations; and in response to determining that the level of power supply demand exceeds a threshold power supply level, triggers the power supply to operate exclusively in the PWM supply mode.

9. The power switching system of claim 8, wherein: the quality level is related to one or more of: (a) a received signal strength indication (RSSI); (b) an information error rate; (c) a signal to noise ratio (SNR); and (d) a modulation index of the signal that is processed by the transceiver.

10. A power switching system comprising:
a power supply capable of selectively operating in one of a PWM supply mode and a PFM supply mode, to supply power to a transceiver; and
a controller coupled to the power supply and to the transceiver and which determines a quality level of a signal that is processed by the transceiver, the controller further triggers the power supply to operate exclusively in the PWM supply mode when the quality level of the signal is below a threshold performance level, else the power supply autonomously switches between the PWM supply mode and the PFM supply mode if the controller does not trigger the power supply to operate in a specific supply mode, wherein: the power supply autonomously switches between the PWM supply mode and the PFM supply mode if the controller does not trigger the power supply to operate in a specific supply mode; and
the PFM supply mode includes one or more of: (a) a pulse skipping modulation (PSM) supply mode; and (b) a PWM supply mode of operation at a lower switching frequency.

11. The power switching system of claim 10, wherein the controller triggers the power supply to operate in the PWM supply mode to prevent an interference related to an activated PFM supply mode and operation of RF circuit components.

12. The power switching system of claim 8, wherein the controller:
determines whether the device operates in one of: (a) a first functional mode that utilizes the transceiver; and (b) a second functional mode that does not utilize the transceiver;
in response to the device operating in the first functional mode, triggers the power supply to activate the PWM supply mode; and
in response to the device operating in the second functional mode, triggers the power supply to allow activation of the PFM supply mode.

13. The power switching system of claim 8, wherein the controller:
evaluates power supply demands for active, concurrent device operating functions associated respectively with functional operational modes of the communications device; determines a respective priority level of the active device operating functions; and triggers the power supply to operate in the supply mode that is pre-established as a best supply mode for an active device operating function that has a highest priority.

14. The power switching system of claim 10, wherein: the quality level is related to one or more of: (a) a received signal strength indication (RSSI); (b) an information error rate; (c) a signal to noise ratio (SNR); and (d) a modulation index of the signal that is processed by the transceiver.

15. In a power switching system, a method comprising:
selectively operating a power supply in one of a PWM supply mode and a PFM supply mode in order to supply power to a transceiver according to an active supply mode of operation;
determining a quality level of a signal that is processed by the transceiver;
triggering, when the quality level of the signal is below a threshold performance level, the power supply to operate exclusively in the PWM supply mode else operating the power supply to autonomously switch between the PWM supply mode and the PFM supply mode;
dynamically determining a level of power supply demand that is associated with dynamically changing device operations; and
in response to determining that the level of power supply demand exceeds a threshold power supply level, triggering the power supply to operate exclusively in the PWM supply mode.

16. The method of claim 15, wherein the quality level is related to one or more of: (a) a received signal strength indication (RSSI); (b) an information error rate; (c) a signal to noise ratio (SNR); and (d) a modulation index of the signal that is processed by the transceiver.

17. The method of claim 15, further comprising:
triggering the power supply to operate in the PWM supply mode to prevent an interference related to an activated PFM supply mode and operation of RF circuit components.

18. The method of claim 15, further comprising:
determining whether the device operates in one of: (a) a first functional mode that utilizes the transceiver; and (b) a second functional mode that does not utilize the transceiver;
in response to the device operating in the first functional mode, triggering the power supply to activate the PWM supply mode; and
in response to the device operating in the second functional mode, triggering the power supply to allow activation of the PFM supply mode.

19. The method of claim 15, further comprising:
evaluating power supply demands for active, concurrent device operating functions associated respectively with functional operational modes of the communications device;
determining a respective priority level of the active device operating functions; and
triggering the power supply to operate in the supply mode that is pre-established as a best supply mode for an active device operating function that has a highest priority.

* * * * *